United States Patent [19]
Jones et al.

[11] Patent Number: 5,401,593
[45] Date of Patent: Mar. 28, 1995

[54] HIGH TEMPERATURE SECONDARY BATTERIES

[75] Inventors: John B. Jones, Portsmouth; David R. Moore; Leonard J. Pearce, both of Poole, all of United Kingdom

[73] Assignee: The Secretary of State for Defence in Her Britannic Majesty's Government of the United Kingdom of Great Britain and Northern Ireland, United Kingdom

[21] Appl. No.: 90,191

[22] PCT Filed: Jan. 14, 1992

[86] PCT No.: PCT/GB92/00076
§ 371 Date: Jul. 14, 1993
§ 102(e) Date: Jul. 14, 1993

[87] PCT Pub. No.: WO92/13366
PCT Pub. Date: Aug. 6, 1992

[30] Foreign Application Priority Data

Jan. 16, 1991 [GB] United Kingdom ............... 9100936

[51] Int. Cl.$^6$ ............................................. H01M 10/39
[52] U.S. Cl. .................................. 429/103; 429/199; 429/218; 429/221
[58] Field of Search ............... 429/112, 103, 221, 199, 429/218

[56] References Cited

U.S. PATENT DOCUMENTS

| | | | |
|---|---|---|---|
| 3,907,589 | 9/1975 | Gay et al. | 429/103 |
| 4,011,372 | 3/1977 | Tomczuk et al. | 429/218 |
| 4,013,818 | 3/1977 | Askew et al. | 429/112 |
| 4,189,529 | 2/1980 | Birt et al. | 429/103 |
| 4,324,846 | 4/1982 | Kaun et al. | 438/112 |
| 4,446,212 | 5/1984 | Kaun | 429/103 |
| 4,851,306 | 7/1989 | Kaun et al. | 429/112 |

*Primary Examiner*—John S. Maples
*Attorney, Agent, or Firm*—Nixon & Vanderhye

[57] ABSTRACT

A high temperature battery which has a cathode comprising either sulphur or a metal sulphide, an anode comprising either an alkali metal, an alkaline earth metal or an alloy of either and, disposed between them, an electrolyte comprising an alkali metal halide. The materials in the cathode composition are electrochemically in excess to the materials in the anode composition. Potassium chloride, potassium iodide or, preferably, potassium bromide is added to the anode, the cathode and the electrolyte. When potassium bromide is added, ideally, it is added to the electrolyte in excess to the alkali metal halides present in the electrolyte. In one particular example, the cathode comprises iron sulphide, the anode comprises a lithium aluminum alloy, the electrolyte comprises a ternary metal halide and potassium bromide is added to all three. Magnesia can be further added to the anode, cathode and electrode.

5 Claims, 3 Drawing Sheets

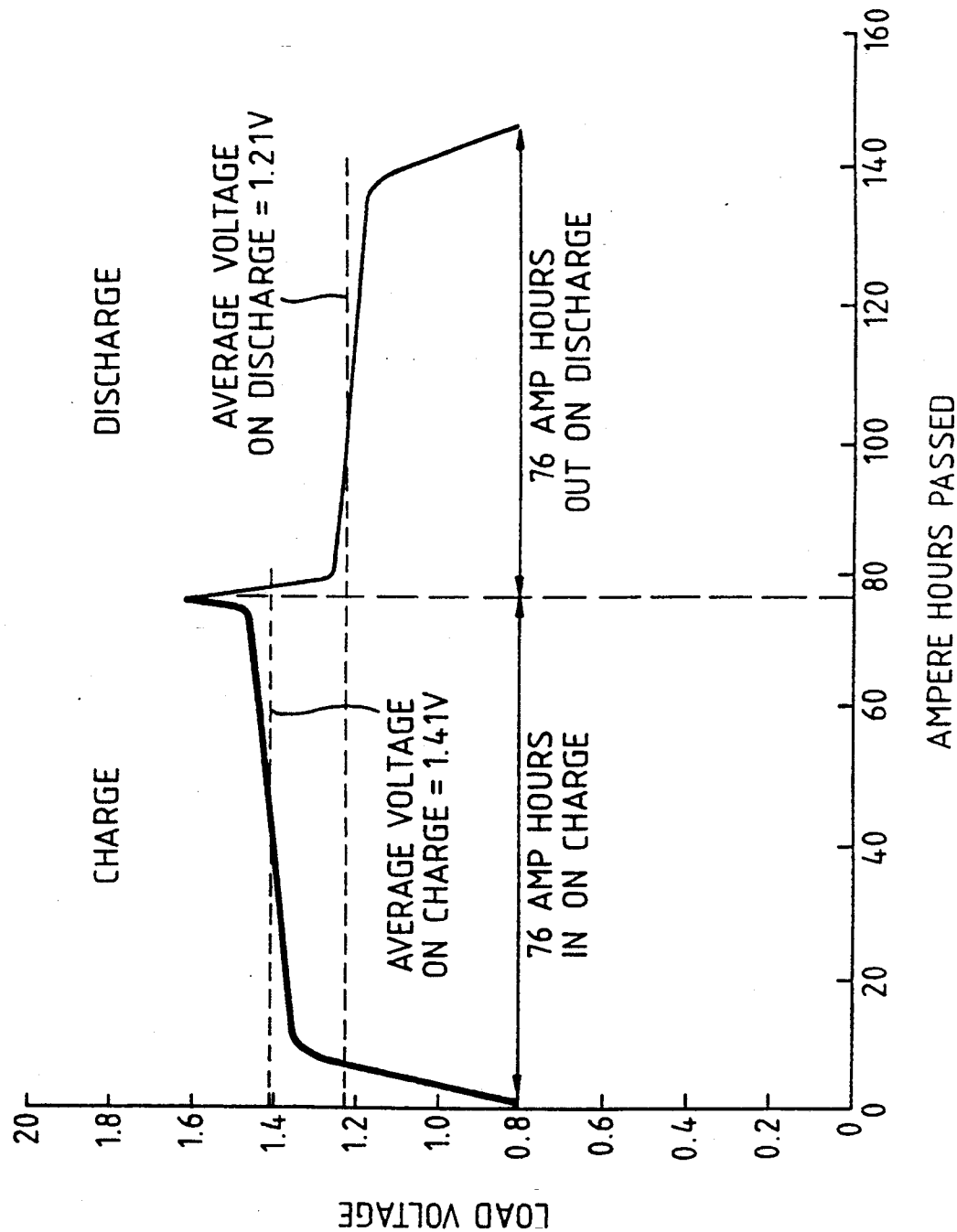

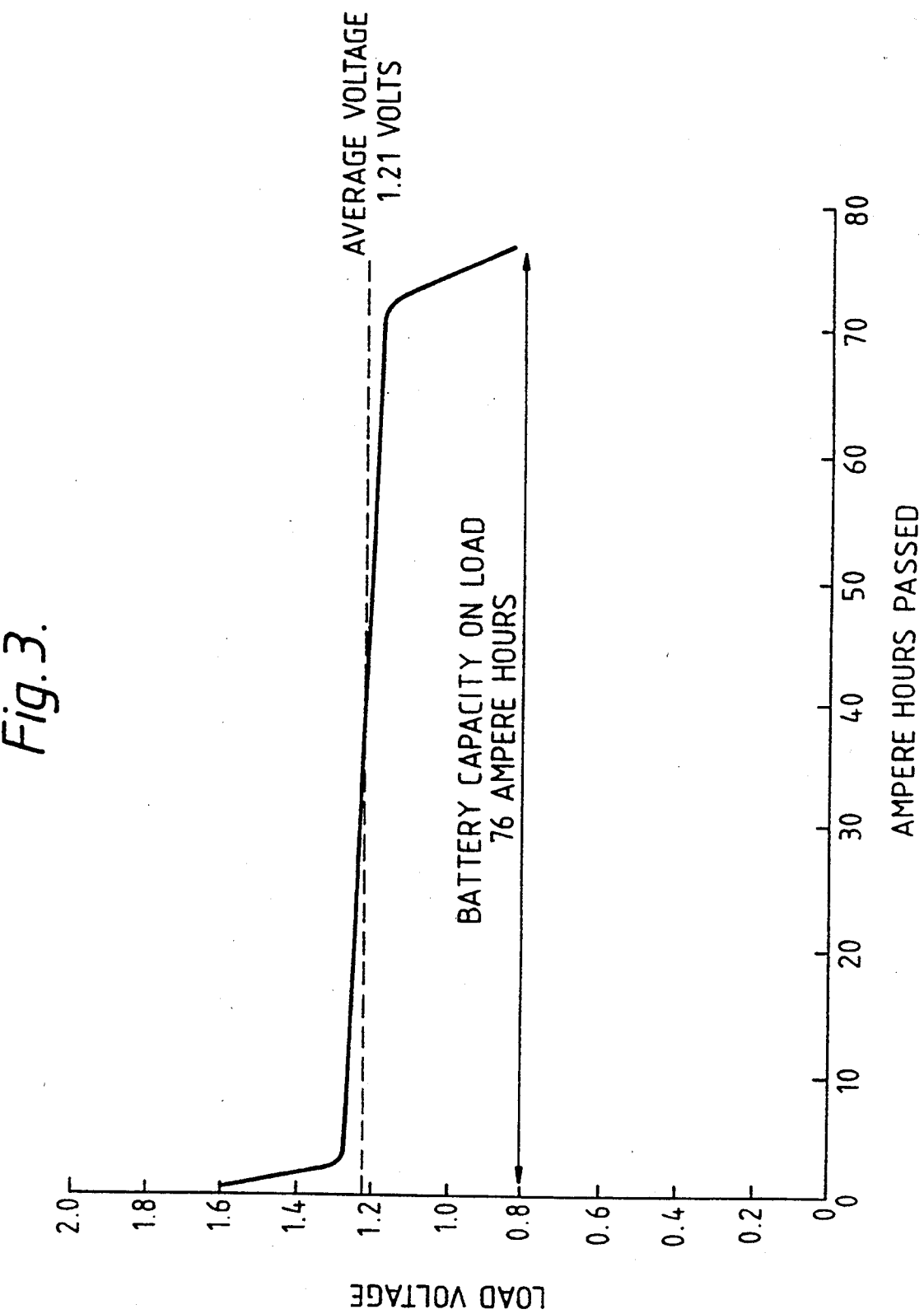

HIGH TEMPERATURE SECONDARY BATTERIES

BACKGROUND OF THE INVENTION

1. Field of the Invention

This invention relates to improvements in high temperature secondary batteries and especially lithium aluminium iron sulphide (LAIS) batteries.

2. Discussion of Prior Art

High temperature secondary batteries have been known for some years. Compared to conventional lead-/acid batteries high temperature secondary batteries can offer similar performance but at only ⅓ the weight and volume. They are formed as an electrolyte separator material sandwiched between an anode and cathode. In the case of a LAIS battery the cathode is ferrous sulphide, the electrolyte is lithium halide and the anode is lithium aluminium alloy. LAIS and related batteries utilise the high power density afforded by the lithium sulphur couple. However the use of these and other high temperature secondary batteries as high power/-high energy batteries has been hampered by various factors such as maintaining conductivity efficiency over many charge/discharge cycles and problems associated with dimensional stability on heating and cooling as batteries are charged and discharged. In certain instances changes in dimensional stability are so severe as to result in internal breakdown of the battery rendering it useless. Where the effects are less severe internal expansion of the battery may cause damage by leakage of electrolyte.

SUMMARY OF THE INVENTION

Consequently there is a need to be able to produce high temperature batteries which overcome or mitigate the above disadvantages.

Accordingly there is provided a high temperature battery which comprises a cathode composed at least partly of sulphur or a metal sulphide, an anode which contains an alkali metal or alkaline earth metal or an alloy of an alkali metal or alkaline earth metal, the cathodic material being electrochemically in excess of the anodic material, and disposed between the anode and cathode an electrolyte containing at least one alkali metal halide characterised in that potassium halide selected from chloride, bromide and iodide is further added to the compositions of the anode, cathode and the electrolyte.

Preferably, the potassium halide added to the anode, cathode and electrolyte is a bromide. Preferably, potassium bromide is added to the electrolyte in excess over the amount of alkali metal halides present in the electrolyte. The inventors have found that potassium bromide can have two effects. It improves the dimensional stability of the battery with the attendant advantages described above and also acts as a part of the electrolyte. It is believed that potassium bromide improves the dimensional stability because it is a bulky constituent and when the electrolyte melts at operating temperature the potassium bromide partially melts as well.

Preferably, the cathode is a metal sulphide and ideally is ferrous sulphide or titanium disulphide, the anode is formed from an alkali metal alloy which is ideally lithium aluminium alloy and the electrolyte is a ternary mixture of lithium fluoride, lithium chloride and lithium bromide. It has been found by the inventors that an electrochemical excess of ferrous sulphide to lithium aluminium alloy results in improved dimensional stability of the battery and increases battery life expectancy whilst maintaining conductivity. Typically the lithium aluminium alloy contains 20–24% by weight of lithium. The reaction between lithium aluminium alloy and ferrous sulphide is

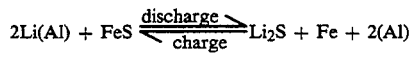

The proportion of FeS to LiAl is in the range 1:0.6–0.9 wt to wt and preferably is about 1:0.66 wt to wt.

In the case of a high temperature secondary battery where the anode comprises lithium aluminium alloy, the cathode comprises ferrous sulphide, preferably, the ratio of lithium aluminium alloy to potassium bromide is about 1:0.23 wt to wt and the ratio of iron sulphide to potassium bromide is about 1:0.19 wt to wt.

Preferably magnesia (MgO) is added to the anode, cathode and electrolyte. Magnesia is an electrical insulator which is cheap and inert when mixed with the electrolyte. It has the effect of helping to hold the electrolyte in place by surface tension.

This is particularly useful when forming stacks of battery cells because the magnesia will help prevent electrolyte from leaking to other cells.

Preferably only the minimum amount of electrolyte is used (based on the starved electrolyte theory). It has been found by the inventors that a thin electrolyte layer containing magnesia allows improved discharge and charging rates. When the battery is of the lithium aluminium iron sulphide type with a ternary halide electrolyte and contains the further addition of a potassium halide, preferably, magnesia is then further added to the anode, cathode and electrolyte, the ratio of the magnesia in the electrolyte to that of the electrolyte, including the potassium halide addition, is in the range of 1:0.5 to 0.7 wt to wt, the ratio of the lithium aluminium alloy to the magnesia in the lithium aluminium alloy being 1:0.21 wt to wt, the ratio of the iron sulphide to the magnesia in the iron sulphide being 1:0.25 wt to wt. Ideally, the ratio of the magnesia in the electrolyte to that of the electrolyte is about 1:0.67 wt to wt.

Alternatively or additionally to the electrolyte compositions already mentioned there may be added lithium aluminate or boron nitride. Optionally carbon can be added to the battery.

The inventors have found that this can improve the working temperature range giving, under optimal conditions, a range of 360°–550° C. It also acts as a bulking agent. Carbon addition may however reduce the overall efficiency of the battery.

When producing batteries according to the present invention it is important that pressure be applied when sealing the cells otherwise the battery is likely to break apart internally. Quite high pressures can be applied as the inside of the battery has a spongy nature.

Batteries made according to the present invention can under appropriate condition undergo many charge/discharge cycles with little or no loss in performance. The inventors have succeeded in performing 2500 cycles with only a slight loss in performance. By comparison other commercially produced batteries may show a significant reduction in performance after about 100 cycles. The batteries of the present invention also show no tendency to discharge if stored.

Furthermore batteries made according to the present invention can demonstrate excellent efficiency and utilisation with coulombic efficiency on discharge/charge of about 100% under optimal conditions. Still further because the battery possesses low internal resistance there may be little difference in discharge/charge voltage giving about 90% efficiency. Utilisation, that is the transfer of lithium ions to the cathode, is also high being in excess of 90% under appropriate conditions.

BRIEF DESCRIPTION OF THE DRAWINGS

The invention will now be described by way of example only and with reference to the accompanying drawings of which:

FIG. 2 shows a graph of the efficiency for the type of battery shown in FIG. 1; and FIG. 3 shows a graph of lithium utilisation for the type of battery shown in FIG. 1.

DETAILED DESCRIPTION OF PREFERRED EMBODIMENT

Figure 1:
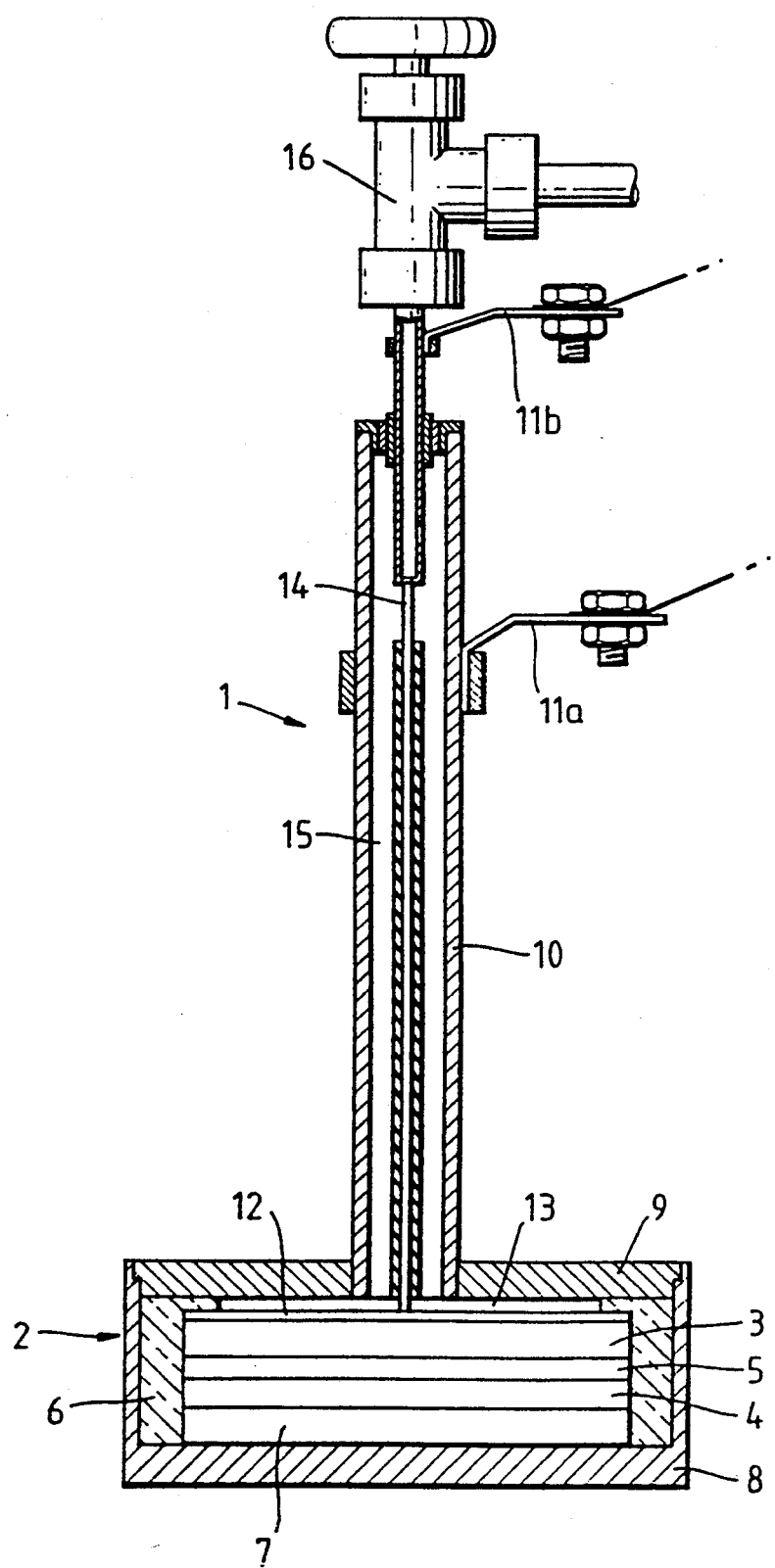
FIG. 1 shows a sectioned side view of a single cell battery based on a lithium aluminium iron sulphide cell.

With reference to FIG. 1, a 6 amp/hour single cell lithium aluminium sulphide (LAIS) battery (1) comprises a cell (2) with an upper layer of powdered ferrous sulphide forming cathode (3) and a lower layer of powdered lithium aluminium alloy containing 20-24% by weight of lithium forming the anode (4). The ratio of iron sulphide to lithium aluminium alloy is 1 to 0.66 wt to wt so that there is an electrochemical excess of cathodic to anodic material. Disposed between the cathode (3) and anode (4) is an electrolyte layer (5) containing a mixture of powdered lithium fluoride, lithium chloride and lithium bromide. The amount of electrolyte present is based on the starved electrolyte theory. Added to the electrolyte layer (5) in excess is powdered potassium bromide to improve the dimensional stability and act as an electrolyte at battery operating temperature. Furthermore powdered potassium bromide is added to the cathode (3) and anode (4). In the case of the cathode (3) the ratio of iron sulphide to potassium bromide is 1:0.19 wt to wt and the ratio of lithium aluminium alloy to potassium bromide in the anode (4) is 1:0.23 wt to wt.

Powdered magnesia is present in the electrolyte (5) in the ratio of 1:6.7 wt to wt. Powdered magnesia is also present in the lithium aluminium alloy in the ratio of 1:0.21 wt to wt and in the iron sulphide in the ratio of 1:0.25 wt to wt.

The side of the cell (2) is formed as a flanged annular ring (6) from an electrically non-conducting material which is capable of resisting the high operating temperatures of the cell (2). At the base of the cell (2) there is a circular steel plate which is in electrical contact with the anode (4). A steel U-shaped dish (8) encloses plate (7) and the side of ring (6). The top inside edge of plate (8) is recessed to accommodate steel circular top plate (9) which is itself connected to the outside of steel rod (10). Connected on the outside and towards the top of the rod (10) is electrical terminal (11a) which via the electrically conductive steel pathway formed by plate (7), dish (8), plate (9) and rod (10) forms the anode terminal. On top of the cathode (3) and beneath the flange of annular ring (6) is a circular steel plate (12) which is in electrical contact with the cathode (3) and isolated from plate (9) by the flange of annular ring (6) and gap (13). A steel stalk (14) connected to plate (12) and running coaxially inside rod (10) and insulated therefrom is connected to cathode terminal (11b). The gaseous content or vacuum of gap (13) is controlled through hollow portion (15) of rod (10) and via valve (16).

The electrical efficiency of an 85 amp/hour LAIS cell is shown in FIG. 2. The average voltage for 76 hours on charge is 1.41V (as represented by the thicker part of the line 0-76 hours) and the average discharge voltage for the same time (76-152 hours) is 1.21V which gives an energy efficiency: $(76 \times 1.21)/(76 \times 1.41) \times 100 = 85.8\%$. A useful feature of the LAIS cell of the present invention shown by FIG. 2 is the near constant voltage over the charge/discharge cycles with the exception of the start and end of the cycles.

FIG. 3 demonstrates the lithium utilisation of the LAIS batteries of the present invention. The graph shows battery capacity on load over 76 ampere hours at an average voltage of 1.21 volts. Lithium utilisation which relates the theoretical battery capacity based on formation of lithium sulphide with the actual capacity based on amp hours of discharge. The lithium utilisation for the 85 amp hour battery shown in FIG. 3 was calculated from the formula:

$$\frac{\text{amp/hours of discharge } 100\%}{\text{theoretical capacity}}$$

that is $(76/85) \times 100$ to be 89.4%.

We claim:

1. A high temperature battery which comprises:
   a cathode composed at least partly of one of sulphur and a metal sulphide,
   an anode which contains one of an alkali metal, an alkaline earth metal, an alloy of an alkali metal and an alloy of an alkaline earth metal, the cathodic material in excess electrochemically of the anodic material, and
   disposed between the anode and cathode, an electrolyte containing at least a potassium halide, wherein potassium bromide is included in each of the anode, cathode and the electrolyte.

2. A high temperature battery as claimed in claim 1 wherein the potassium bromide added to the electrolyte is in excess over the amount of the alkali metal halides present in the electrolyte.

3. A high temperature battery as claimed in claim 1 wherein the anode comprises lithium aluminium alloy, the cathode comprises ferrous sulphide and the ratio of lithium aluminium alloy to potassium bromide is about 1:0.23 wt to wt and the ratio of iron sulphide to potassium bromide is about 1:0.19 wt to wt.

4. A high temperature battery which comprises:
   a cathode composed at least partly of one of sulphur and a metal sulphide,
   an anode which contains one of an alkali metal, an alkaline earth metal, an alloy of an alkali metal and an alloy of an alkaline earth metal, the cathodic material in excess electrochemically of the anodic material, and
   disposed between the anode and cathode, an electrolyte containing at least a potassium halide, said halide selected from one of chloride, bromide and iodide, is included in each of the anode, cathode and the electrolyte, wherein the battery is a lithium aluminium iron sulphide battery with a ternary halide electrolyte, magnesia is added to the anode, cathode and electrolyte, the ratio of the weight of magnesia in the electrolyte to the weight of the electrolyte is in the range of 1:0.5 to 0.7, the ratio of the weight of lithium aluminium alloy to the weight of magnesia in the lithium aluminium alloy being 1:21, the ratio of the weight of iron sulphide to the weight of magnesia in the iron sulphide being 1:0.25.

5. A high temperature battery which comprises:
a cathode composed at least partly of one of sulphur and a metal sulphide, an anode which contains one of an alkali metal, an alkaline earth metal, an alloy of an alkali metal and an alloy of an alkaline earth metal, the cathodic material in excess electrochemically of the anodic material, and disposed between the anode and cathode, an electrolyte containing at least a potassium halide, said halide selected from one of chloride, bromide and iodide, is included in each of the anode, cathode and the electrolyte, wherein lithium aluminate is added to the electrolyte.

* * * * *